United States Patent
Katsuyama

[11] 3,720,151
[45] March 13, 1973

[54] DEVICE FOR OSCILLATING IMAGE PLANE ON THE SIDE OF PHOTOELECTRIC ELEMENT IN AUTOMATIC FOCUSING DEVICE

[75] Inventor: Yoshihisa Katsuyama, Kawasaki, Japan

[73] Assignee: Nippon Kogaku K.K., Tokyo, Japan

[22] Filed: Sept. 17, 1970

[21] Appl. No.: 72,983

[30] Foreign Application Priority Data

Sept. 29, 1969 Japan.................................44/77066

[52] U.S. Cl........................................95/44 R, 95/45
[51] Int. Cl..................................................G03b 3/02
[58] Field of Search........................95/44 R, 44 C, 45

[56] References Cited

UNITED STATES PATENTS

| | | |
|---|---|---|
| 3,610,733 | 10/1971 | Back...........................................95/45 |
| 3,495,913 | 2/1970 | Hoagland..................................95/44 |
| 3,185,059 | 5/1965 | Durst.......................................95/44 C |
| 3,479,943 | 11/1969 | Goshima...................................95/45 |
| 3,493,764 | 2/1970 | Craig........................................95/44 |

*Primary Examiner*—Samuel S. Matthews
*Assistant Examiner*—E. M. Bero
*Attorney*—Harry G. Shapiro

[57] ABSTRACT

An automatic focusing apparatus in a camera includes a photoelectric element adapted to receive the light rays passing through the objective and partly reflected by a semi-transparent mirror. The image plane of the reflected light rays is oscillated by two lenses disposed between the mirror and the photoelectric element which are engaged with a cam to move in opposite directions from each other. The electric signal from the photoelectric element actuates a servo motor to move the objective for automatic focusing.

10 Claims, 9 Drawing Figures

INVENTOR.
YOSHIHISA KATSUYAMA
BY Harry G. Shapiro
ATTORNEY

FIG. 3 FIG. 4 FIG. 5
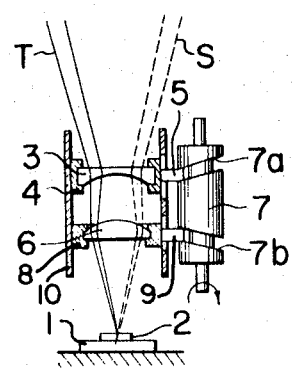 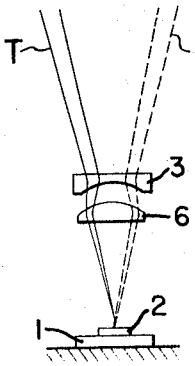 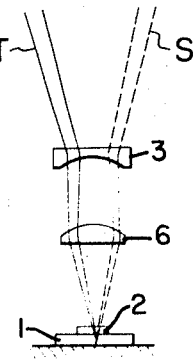
FIG. 6 FIG. 7 FIG. 8
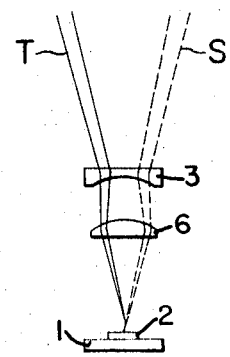 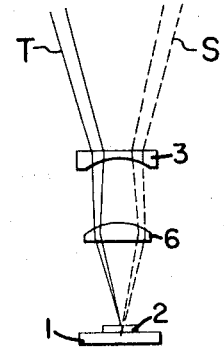 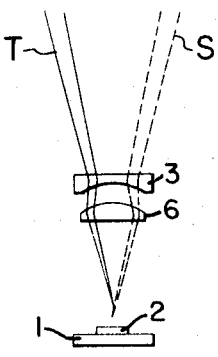
FIG. 9
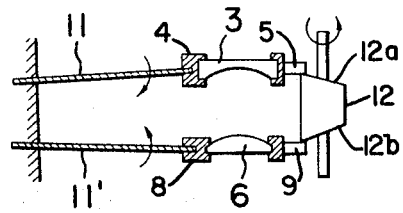

DEVICE FOR OSCILLATING IMAGE PLANE ON THE SIDE OF PHOTOELECTRIC ELEMENT IN AUTOMATIC FOCUSING DEVICE

FIELD OF THE INVENTION

The present invention relates to a device for oscillating the image plane on the side of a photoelectric element in an automatic focusing device for use in cameras or the like.

BRIEF DESCRIPTION OF THE DRAWING

A clear concept of the scope and purpose of this invention may be obtained from the following description taken with the drawings in which:

FIG. 3 is a fragmentary front view, partly in section, of the embodiment shown in FIG. 2;

FIGS. 4–8 are diagramatic views illustrating the shift of the image plane in accordance with the operation of the present invention;

FIG. 9 is a fragmentary sectional view of a second embodiment of the present invention.

BACKGROUND OF THE INVENTION

Figure 1:
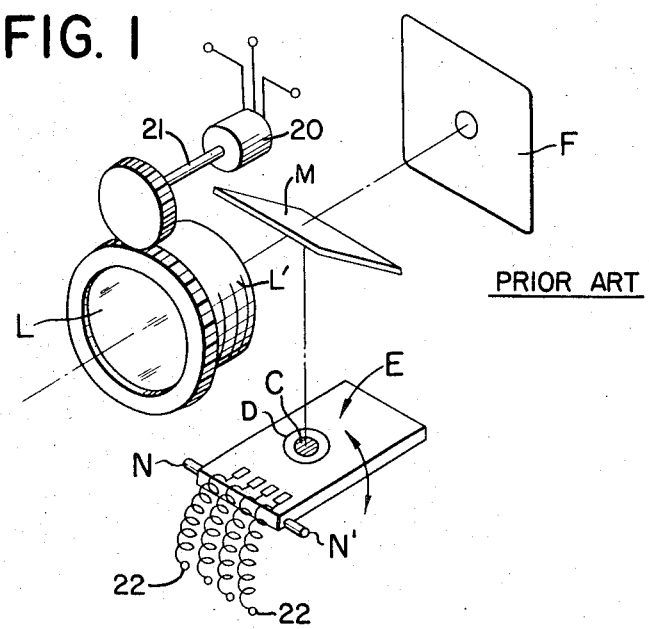
FIG. 1 is a perspective view of a conventional automatic focusing device.

A prior art automatic focusing device, as taught in U.S. Pat. No. 3,511,155, is shown in FIG. 1. A subject to be photographed is focused through an objective L having a helicoid L' for focusing upon a photo-sensitive element i.e.; CdS element D having an effective area C which is located in a conjugate position with an image aperture plane F. The CdS element is oscillated by an oscillating plate E about an axis NN' in the direction of the optical axis at several tens of cycles per second. The pulses generated when the CdS element C passes through the image plane are fed to a servo-motor or the like 20, so that the servo-motor 20 rotates an output shaft 21 to move the objective L along the optical axis and to thereby automatically form an image of the subject on the image plane F.

However, the oscillation of the photo cell C tends to cause the leads 22 connected to the CdS element to become disconnected and the electrodes of the CdS element tend to become separated. Furthermore when a detecting circuit composed of plurality of small bridges (not shown) is placed upon the oscillation plate E, the inertial mass to be oscillated is increased so that the oscillation frequency of the plate becomes less stable.

SUMMARY OF THE INVENTION

It is an object of the present invention to provide an improved image-plane oscillating device for an automatic focusing apparatus which eliminates the above mentioned disadvantages by oscillating an optical system located before a CdS element in the direction of the optical axis instead of by oscillating the CdS element per se.

To accomplish this object, the present invention provides a semi-transparent member or mirror M which is interposed in the image-forming optical path in an automatic focusing device so as to reflect a part of the image-forming light to a photoelectric element which is fixed securely in position. An optical system for increasing or decreasing the optical path length is located before the photoelectric element and is oscillated in the direction of the optical axis so that the image plane of the whole optical system may be shifted through the plane of the photoelectric element. The optical system for increasing or decreasing the optical path length comprises a negative and a positive lens which are oscillated symmetrically with relation to each other in the direction of the optical axis by means of engaging the holders for the lenses with cam grooves formed in a cylindrical cam which in turn is rotatably mounted on the body of the automatic focusing device. The total mass of the negative lens and its holder is equal to that of the positive lens and its holder. Alternatively, the negative and positive lenses may be supported by resilient members in such a manner that both of the lenses may be oscillated in the direction of the optical axis upon rotation of the cylindrical cam. The holders for the negative lens and for the positive lens are shifted symmetrically and have the same mass so that the reaction forces acting upon the cylindrical cam may be cancelled. Therefore, the stability and high efficiency of the optical path length varying system may be ensured, even at a high speed.

DESCRIPTION OF THE PREFERRED EMBODIMENTS

Figure 2:
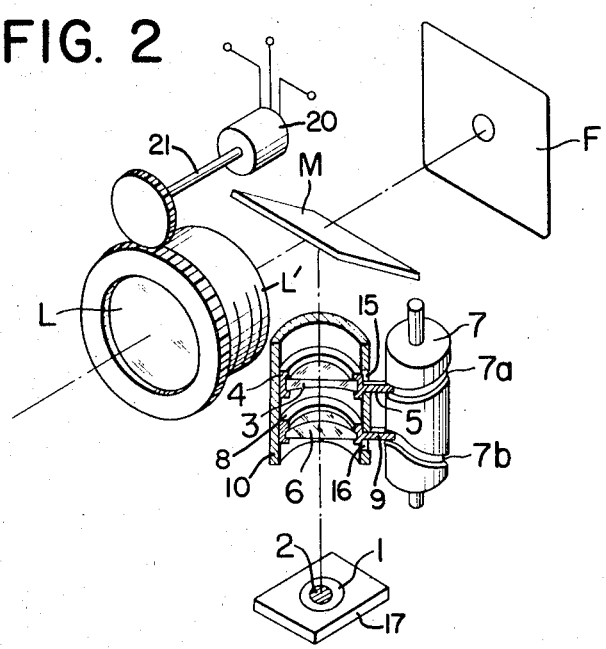
FIG. 2 is a perspective view of an embodiment of an automatic focusing device in accordance with the present invention, partly in section.

Referring to FIG. 2, the CdS element 1 and its effective area 2 correspond to those areas identified by D and C in FIG. 1, but the CdS element 1 is securely fixed to the body 17 of the automatic focusing apparatus. A negative lens 3 is supported in a lens holder 4 on which a pin 5 is formed. A positive lens 6 is supported in a lens holder 8 on which a pin 9 is formed. The holders 4 and 8 are slidably disposed within a hollow cylinder 10, which is formed with two slots 15 and 16 in the same longitudinal direction to project therethrough the pins 5 and 9. A rotatable cam cylinder 7 is provided with cam grooves 7a and 7b into which the pins 5 and 9 are fitted, respectively. The cam grooves 7a and 7b are in symmetrical relation to each other. Therefore, when the cam cylinder 7 is rotated, the lenses 3 and 6 are equally moved away from and toward each other. The total mass of the lens 3 and the holder 4 is equal to that of the lens 6 and the holder 8. Therefore, upon movement of the lenses 3 and 6, the reaction force which is exerted on the cam cylinder 7 by the pin 5 is as large as that (which is exerted on the cam cylinder 7) caused by the pin 9. Since the reaction forces act in the opposite direction to each other, they cancel each other out. A portion of the light passing through an objective L is reflected on a semi-transparent member or mirror M toward the negative lens 3. The relative movement of the lenses 3 and 6 shifts the image position at which the subject to be photographed is focused by the objective L. The lens holders 4 and 8 of the negative lens 3 and the positive lens 6 are adjusted so that their masses are equal.

Referring to FIG. 3, the light rays indicated by the solid lines T are those of a subject to be photographed which is located in the distance, while the light rays indicated by the broken lines S, are those from a subject to be photographed relatively nearer to the objective L.

FIGS. 3, 4 and 5 show the mode of shifting of the negative and positive lenses 3 and 6 when the objective L in FIG. 2 is adjusted to a position such that the subject in the distance may be focused upon the image aperture F. In the position shown in FIG. 3, the light rays T from the distant subject to be photographed are focused upon the effective area 2 of the CdS 1 while the light rays S from the nearer subject to be photographed are out of focus. When the negative lens 3 and the positive lens 6 are moved toward each other as shown in FIG. 4, the light rays from the nearer subject to be photographed are focused upon the effective area 2 while the light rays from the distant subject to be photographed are out of focus. On the other hand, when the negative lens 3 and the positive lens 6 are moved away from each other as shown in FIG. 5, the light rays from both the distant and nearer subjects are out of focus.

FIGS. 6, 7 and 8 show the mode of shifting of the negative and positive lenses 3 and 6 when the objective L is adjusted to focus the light rays from the nearer subject to be photographed upon the image-aperture F. In the position as shown in FIG. 6, the light rays from the subject to be photographed nearer to the objective L are focused upon the effective area 2 of the CdS element 1 while the light rays from the subject distant from the objective L are out of focus. When the lenses 3 and 6 are moved away from each other as shown in FIG. 7, the light rays from the subject distant from the objective L are focused upon the effective area of the CdS element 2 while the subject nearer to the objective L are out of focus thereupon. When the lenses 3 and 6 are moved toward each other, the light rays from both the subjects distant from and nearer to the objective L are out of focus as shown in FIG. 8.

From the foregoing, it is seen that every subject to be photographed which lies between nearer and distant places about the objective L may be focused upon the CdS element. When the negative and positive lenses 3 and 6 are moved toward and away from each other by rotating the cam cylinder 7, the pulses may be generated from the CdS element and fed into the conventional automatic focusing mechanism.

Another embodiment of the present invention is illustrated in FIG. 9. The lens holders 4 and 8 for the negative and positive lenses 3 and 6 are each fixed to one end of plate springs 11 and 11' whose other ends are securely fixed to the body of the automatic focusing device. The plate springs 11 and 11' bias the lens holders 4 and 8 toward each other. This arrangement eliminates the hollow cylinder 10 in the first embodiment. The pins 5 and 9 extending from the lens holders 4 and 8 are pressed against the upper and lower cam surfaces 12a and 12b of the cam 12 under the force of the springs 11 and 11' so that upon rotation of the cam 12 the negative and positive lenses 3 and 6 are moved toward and away from each other. As opposed to the first embodiment where there exists some gap between the pins and the cam grooves the lenses in the second embodiment may be smoothly displaced. Additionally, the construction of the second embodiment is simpler than that shown in the first embodiment.

What is claimed is:

1. In an automatic focusing device for a camera including an objective, means for focusing upon a photosensitive element in conjugate relation with an image aperture plane, a motor for moving the objective in response to pulses generated by the photosensitive element, and light reflecting means in the image forming optical path to reflect part of the light to the photosensitive element, the improvement comprising means to fix the position of the photosensitive element, a first lens and a second lens in addition to the objective and disposed in spaced relation on the optical axis between the photosensitive element and said light reflecting means, and means to move the first and second lenses toward and away from each to shift the image position at which the subject to be photographed is focused by the objective.

2. In an automatic focusing device according to claim 1 wherein the means to move the first and the second lenses comprise a first cam surface; a second cam surface; a holder for the first lens operatively engaged with the first cam surface to move the first lens; and a holder for the second lens operatively engaged with the second cam surface to move the second lens.

3. In an automatic focusing device according to claim 2 wherein the means to move the first and the second lenses further comprise a rotatably mounted cam cylinder having the first and the second cam surfaces thereon.

4. In an automatic focusing device according to claim 3 wherein the first cam surface and the second cam surface are disposed in relative symmetric relation so that the first lens and the second lens will move in relative symmetric relation.

5. In an automatic focusing device according to claim 4 wherein the inertial mass of the first lens and first lens holder is the same as the inertial mass of the second lens and second lens holder, so that the resultant force of the first lens and first lens holder on the first cam surface will be equal and opposite to the resultant force of the second lens and second lens holder on the second cam surface.

6. In an automatic focusing device according to claim 5 further comprising first pin means extending from the first lens holder to engage the first cam surface and second pin means extending from the second lens holder to engage the second cam surface.

7. In an automatic focusing device according to claim 6 further comprising resilient means connected to the first lens holder and the second lens holder to urge the first pin means and the second pin means into engagement with the first cam surface and the second cam surface respectively.

8. In an automatic focusing device according to claim 6 including means to support the first lens holder and the second lens holder comprising a housing having a first slit and a second slit; the first pin means extending from the first lens holder through the first slit; and the second pin means extending from the second lens holder through the second slit.

9. In an automatic focusing device according to claim 6 wherein the first cam surface comprises a first cam groove in the rotatable cam cylinder and the second cam surface comprises a second cam groove in the rotatable cam cylinder.

10. In an automatic focusing device according to claim 6 wherein the first cam surface comprises one end surface of the rotatable cam cylinder and the second cam surface comprises the other end surface of the rotatable cam cylinder.

* * * * *